(12) United States Patent
Karlicek, Jr. et al.

(10) Patent No.: US 8,869,419 B2
(45) Date of Patent: Oct. 28, 2014

(54) EFFICIENT IRRADIATION SYSTEM USING CURVED REFLECTIVE SURFACES

(75) Inventors: Robert F. Karlicek, Jr., Clifton Park, NY (US); Robert Sargent, Chelmsford, MA (US)

(73) Assignee: SolidUV, Inc., Clifton Park, NY (US)

(*) Notice: Subject to any disclaimer, the term of this patent is extended or adjusted under 35 U.S.C. 154(b) by 552 days.

(21) Appl. No.: 12/660,405

(22) Filed: Feb. 25, 2010

(65) Prior Publication Data

US 2010/0223803 A1 Sep. 9, 2010
US 2013/0025152 A9 Jan. 31, 2013

Related U.S. Application Data

(63) Continuation-in-part of application No. 12/704,104, filed on Feb. 11, 2010.

(60) Provisional application No. 61/208,485, filed on Feb. 25, 2009, provisional application No. 61/152,416, filed on Feb. 13, 2009.

(51) Int. Cl.
*F26B 3/34* (2006.01)
*H05G 2/00* (2006.01)
*B05D 3/06* (2006.01)

(52) U.S. Cl.
CPC .................................. *B05D 3/061* (2013.01)
USPC ........................................ 34/275; 250/504 R

(58) Field of Classification Search
USPC ................. 34/275; 250/504 R, 492.1, 506.1, 250/453.11, 454.11, 455.11; 362/249.02, 362/327, 328, 341–350, 609, 623, 516, 514, 362/247; 392/419–423; 219/506, 502
See application file for complete search history.

(56) References Cited

U.S. PATENT DOCUMENTS

| | | | |
|---|---|---|---|
| 3,686,543 A | 8/1972 | Nyul | |
| 5,999,335 A * | 12/1999 | Koyama et al. | 359/738 |
| 6,130,736 A * | 10/2000 | Sasaki et al. | 349/122 |
| 6,257,737 B1 | 7/2001 | Marshall et al. | |
| 6,601,970 B2 | 8/2003 | Ueda et al. | |
| 6,683,421 B1 | 1/2004 | Kennedy et al. | |
| 6,975,465 B1 | 12/2005 | Chung et al. | |
| 7,011,434 B2 | 3/2006 | Pate | |
| 7,137,696 B2 | 11/2006 | Siegel | |
| 7,170,100 B2 | 1/2007 | Erchak et al. | |
| 7,306,352 B2 | 12/2007 | Sokolov et al. | |
| 7,348,603 B2 | 3/2008 | Erchak et al. | |
| 7,355,155 B2 * | 4/2008 | Wang | 250/205 |
| 7,401,943 B2 | 7/2008 | Okamitsu et al. | |
| 8,147,081 B2 * | 4/2012 | Mrakovich et al. | 362/84 |
| 8,193,514 B2 * | 6/2012 | Ferraro et al. | 250/455.11 |
| 2005/0158687 A1 * | 7/2005 | Dahm | 433/29 |
| 2010/0260945 A1 * | 10/2010 | Kites et al. | 427/553 |
| 2011/0182070 A1 * | 7/2011 | Curran et al. | 362/235 |

FOREIGN PATENT DOCUMENTS

AU 2008-203146 2/2009
EP 1780798 5/2007

* cited by examiner

*Primary Examiner* — Kenneth Rinehart
*Assistant Examiner* — John McCormack

(57) ABSTRACT

An assembly and method for irradiating a surface utilizing a plurality of LEDs in a pattern such that a linear fill factor characterizing such pattern is at least 80% along a focusing direction and/or at least 20% along a direction transverse to said focusing direction, the radiation emitted from the LEDs and reflected onto the surface from a trough reflector.

27 Claims, 6 Drawing Sheets

EFFICIENT IRRADIATION SYSTEM USING CURVED REFLECTIVE SURFACES

CROSS-REFERENCES TO RELATED APPLICATIONS

This application claims priority under 35 U.S.C. §119 (e) to, and hereby incorporates by reference, U.S. Provisional Application No. 61/208,485, filed 25 Feb. 2009 and is a CIP of Ser. No. 12/704,104 Feb. 11, 2010 which claims benefit of 61/152,416 Feb. 13, 2009.

BACKGROUND OF THE INVENTION

1. Field of the Invention

This invention relates to electromagnetic irradiation of surfaces and, in particular, this invention relates to LED-emitted electromagnetic irradiation of surfaces from reflectors.

2. Background

Typically, parabolic or elliptical reflectors are used for directing radiation using reflective optics to achieve uniform or focused irradiance, respectively. Obviously, other irradiance patterns can be generated using more complex reflector geometries. However, the quality of focus or collimating irradiance is largely dependent on how well irradiance is concentrated at the focal point of the optic. The foregoing problem is illustrated in FIG. 1, exemplifying an elliptical reflector 100 and a radiant (arc) source 102. While the reflective optic could be any curved surface, generally elliptical (focusing) or parabolic (collimating) reflective optics is most common. While this discussion applies to several reflector system geometries, the elliptical reflector depicted in FIG. 1 is exemplified. In FIG. 1A, assuming a small point arc source placed at the focal point f1 of the elliptical reflector 100, emitted radiation, as exemplified by light rays 103, can be focused at a secondary focal point f2 to achieve a desirable discrete focal image 104. However, a very small translation along focusing direction h of the point arc source 102 away from the focal point f2 defocuses the image about the second focal point f2 as shown at 106.

Where the radiation source is linear, such as a fluorescent lamp, the reflector may be an elliptical trough or a portion of an ellipse. The optical center of the linear lamp is placed along a focal line of the trough reflector. For example, if the arc source 102 of FIGS. 1A and 1B is linear, f1 would be a cross-section of a line, rather than a point. This is shown in FIG. 2, where the point source is replaced with a linear radiation source 108 such as a linear fluorescent lamp or linear arc lamp. The linear radiation source 108 is positioned so that the axis of the linear source is positioned at the focal line f1 of the trough reflector. In the case that the trough reflector 110 is a portion of a reflective elliptical surface, irradiance from the source, as depicted by rays 116, is focused along line f2. In the case that the trough reflector is a reflective parabolic surface, the rays 116 would be spread to uniformly irradiate a plane containing line f2. Displacement of the linear radiation source along direction h from the focal line f1 of the trough would reduce either the focus of the source at f2 (elliptical surface) or the uniformity in the plane containing f2 (parabolic surface).

SUMMARY OF THE INVENTION

An assembly is provided by this invention, the assembly having a reflector and a UV array. The UV array may have a plurality of UV emitting LEDs arranged spatially in a pattern such that a linear fill factor characterizing such a pattern is at least 80% along a focusing direction and/or at least 20% along a direction normal, or otherwise transverse, to the focusing direction. The reflector may be a trough reflector and may collimate or focus the UV radiation.

There is also provided a method of manufacturing the foregoing UV array.

There is further provided a method of irradiating a surface with the foregoing array.

It is understood that the above-described figures are only illustrative of the present invention and are not contemplated to limit the scope thereof.

DETAILED DESCRIPTION

Each of the additional features and methods disclosed herein may be utilized separately or in conjunction with other features and methods to provide improved devices of this invention and methods for making and using the same. Representative examples of the teachings of the present invention, which examples utilize many of these additional features and methods in conjunction, will now be described in detail with reference to the drawings. This detailed description is merely intended to teach a person of skill in the art further details for practicing preferred aspects of the present teachings and is not intended to limit the scope of the invention. Therefore, specific combinations of features and methods disclosed in the following detailed description may not be necessary to practice the invention in the broadest sense and are instead taught merely to particularly describe representative and embodiments of the invention.

Figure 1A:
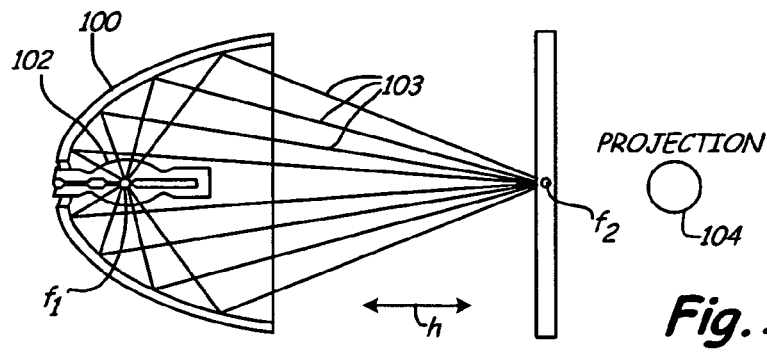
FIG. 1A is a reflector of the prior art showing a focused light ray from a singular light source.
Figure 1B:
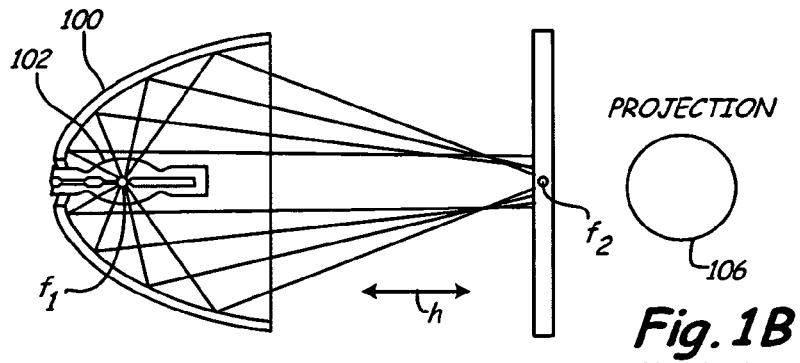
FIG. 1B is a reflector of the prior art showing how the focus of FIG. 1 is affected by displacing the light source toward the focal point.
Figure 2:
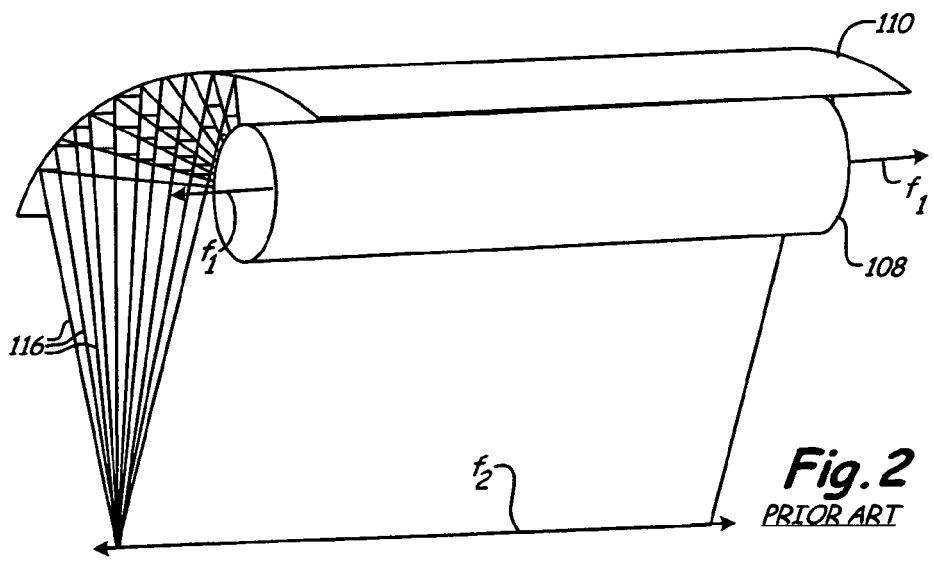
FIG. 2 is a perspective view of a trough reflector and a continuous light source (such as a mercury arc lamp) of the prior art.
Figure 3:
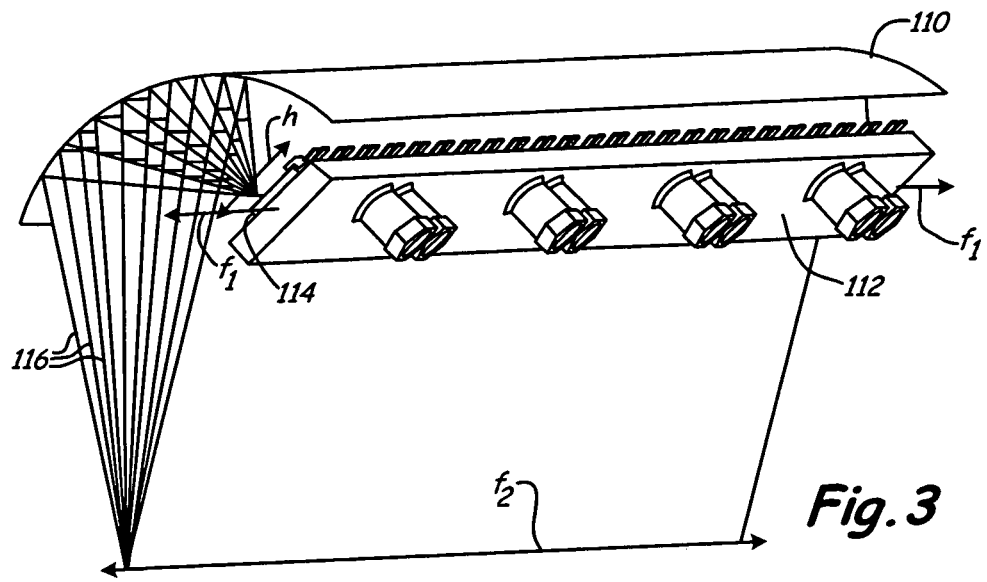
FIG. 3 is a perspective view of a trough reflector and an LED array of this invention.

In the case of a trough reflector with light emitting diodes (LEDs) as shown in FIG. 3, the trough reflector 110 focuses irradiance from an array 112 of individual LEDs 114, as depicted by rays 116. In FIG. 3, the irradiance is focused linearly along line f2. However, since each of the LEDs 114 is not infinitely small in the focusing direction h, not all of the light from the LEDs can be properly imaged by the reflector 110. The focus further deteriorates when arrays of LEDs are required to generate sufficient light. In such a case, the emitting surfaces become separated even further away from the focal line f2 of the reflector 110, thereby reducing the focusing efficacy of the reflector 110.

One remedy to the problem illustrated above (deteriorating focus or collimation when a plurality of LEDs is used) is to maximize the fill factor (packing density) of the LED chips or lamps along the primary axis of the ellipse f1 as will more fully be explained herein. The best case scenario would be a fill factor of 100% or a large, single LED chip.

Figure 4:
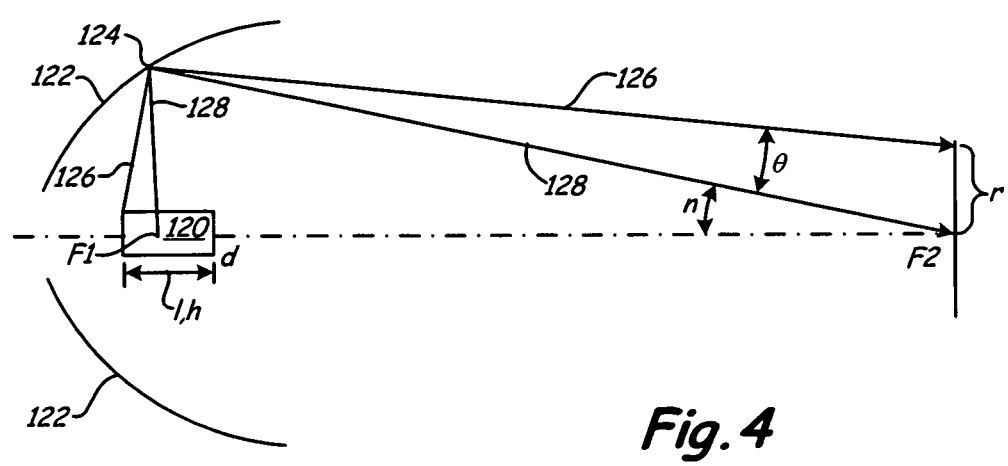
FIG. 4 is a schematic representation of the light dispersion from an LED of length l.

Optimal use of elliptical trough reflectors for imaging a primary (source) focal line at a secondary (image) focal line is best accomplished by concentrating the emission along the primary focal line. This is illustrated in FIG. 4, where an LED emitter 120 having length l and being centered at F1 along direction h and is imaged at F2. Emission 126 from the left edge of the LED 120 impinges reflector 122 at point 124, but at an angle theta (Θ) from an emission 128 from the center of the LED 120. The emission 126 is reflected from the same point of the ellipse at angle theta (Θ) from emission 128 and, hence, misses F2 by a distance r. Accordingly, the image dimension would be 2r. For maximum concentration of light at F2, the emitter length l must be as small as possible. For maximum irradiance, as measured by W/cm², at F2 the surface emission from the LED with length l should be as high as possible. Translating the image in FIG. 4 perpendicular to the page creates a trough where F1 becomes the source focal line L1 and F2 becomes the image line L2, lines L1, L2 not being shown.

Figure 5:
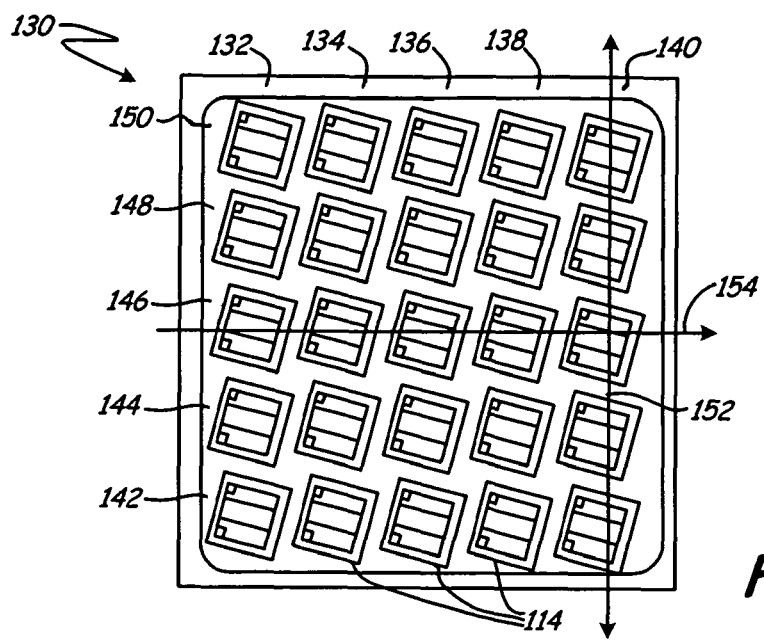
FIG. 5 is a plan view of an exemplary LED array.

A single LED chip can produce only so much emission from a given amount of electrical energy. Therefore, if a given application requires higher irradiance than can be obtained from a single LED chip and optimized optics, one typically increases the number of LED chips, arranging the LEDs in an array. One example of an LED array is depicted in FIG. 5 at 130. In array 130 there are five exemplary columns 132, 134, 136, 138, 140 and five exemplary rows 142, 144, 146, 148, 150 of the LEDs 114. Since electrical connections must exist for each individual LED, it is difficult to achieve packing densities much higher than 70% for any arbitrary m×n array in which either n or m is greater than two. For FIG. 5, m and n are each 5. For example, if FIG. 5 depicts an array of 1 mm² LED chips in a 5×5 array with a packing density of approximately 62%, then along either the vertical axis 152 or horizontal axis 154 the ratio of non-imaging (non-emitting) to emitting surface area is slightly less than 80%.

Regarding the LED 120 of FIG. 4, the vertical axis h in FIG. 5 would be collinear with the focusing direction h in FIG. 4. Spreading the emission away from the focal line by spreading the LED chips apart reduces the emission concentration at the image focal line F2. The non-emitting gaps between the LED chips also reduce the overall surface irradiance. If the LED chips in the array 130 could be replaced by a single large LED with the same emitting area, such as 5 mm×5 mm, both the source irradiance and the irradiance at F2 would be significantly higher because all of the LED emission would be concentrated in the smallest possible distance along h, leading to the highest concentration at F2. Stated otherwise, using a single large LED chip instead of the array depicted in FIG. 5 is equivalent, in FIG. 4, to shortening the emitter length l without sacrificing intensity. Accordingly, the radiation is more highly concentrated at the imaged focal point F2.

Figure 7A:
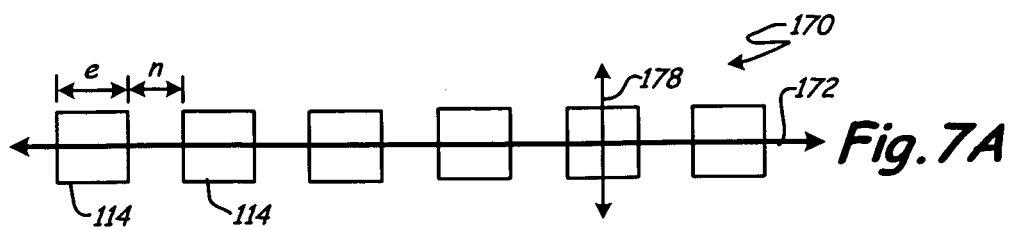
FIGS. 7A, 7B, 7C show exemplary LED arrays of this invention.

Referring to FIG. 7A, an array 170 of equally spaced LED chips 114 is shown along an axis 172. Dimensionally, the array 170 may be characterized by an emitting length e for each LED chip 114 and a length n for a non-emitting interval between adjacent LED chips 114. Because of the equidistant spacing, a linear fill factor (LFL), with respect to axis (direction) 172, is the ratio of e to the total e+n or LFL=e/(e+n). If the distribution is not equidistant, LFL=$(\Sigma e_i/(e_i+n_i))/k$, for each LED chip and adjacent non-emitting space i averaged over k chips and adjacent non-emitting spaces.

Figure 6:
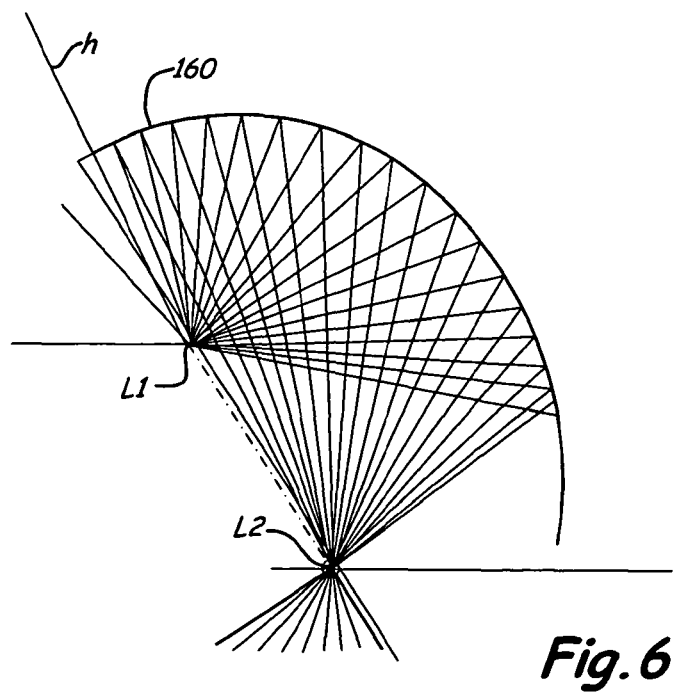
FIG. 6 is a representation of light distribution from an LED, the light reflected and focused by a trough reflector.
Figure 10:
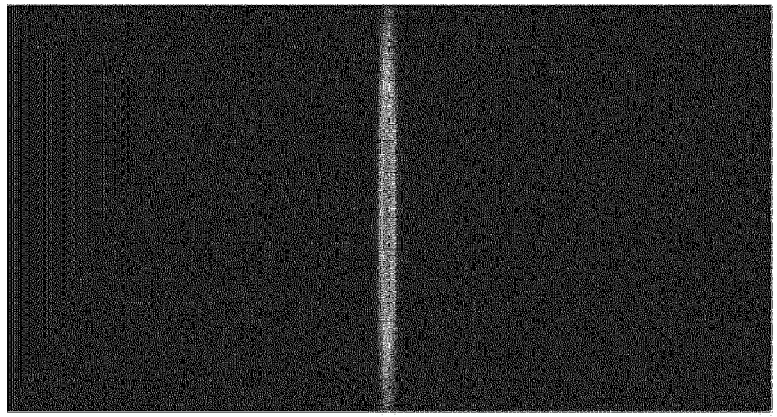
FIG. 10 illustrates the intensity map at L2 of FIG. 6 (running horizontally through the bright spot in the intensity profile). The vertical width of the intensity map shown on the right is approximately 8 mm high and 300 mm left to right (the width of the box on the left).

Focus of a reflective trough 160 is not affected by the linear fill factor along the focal line L1 of FIG. 6. However the irradiance at L2, as well as the uniformity of the irradiance along L2, will be affected. FIG. 6 depicts an optical raytracing single LED chip placed at a focal line L1 of an elliptical reflecting trough 160. The LED at L1 is placed along the focal line L1 of the elliptical trough 160, then re-imaged at L2. The LED in this case is a Lambertian emitter to allow and utilize discrete point sources at L1. FIG. 10 shows the intensity map at L2 of FIG. 6 (running horizontally through the bright spot in the intensity profile). The vertical width of the intensity map shown on the right is approximately 8 mm high and 300 mm left to right (the width of the box on the left). Depending upon the irradiance profile desired along L2, the linear fill factor along L1 can be adjusted to improve uniformity and to increase irradiance along L2 by overlapping intensity profiles from individual LEDs spaced along L1. Accordingly, one embodiment of this invention provides adequate uniformity when the LFL is at least 20%.

Clearly, LEDs can be used with reflective optics to create various irradiance profiles at a distance. Plus, the linear fill factor (packing density) of LEDs along a focal direction, such as h, has a significant influence on the focusing ability (and irradiance in W/mm.sup.2) of elliptical trough reflectors. However, the linear fill factor along the focal line of the reflector primarily affects the uniformity of the irradiance along L2. As stated previously, analogous rationale can be made for collimating capability of parabolic trough reflectors or the imaging capability of curved trough reflectors of other geometries.

It is usually desirable to control both the irradiance magnitude and irradiance profile (distribution) at the image plane of the trough reflecting optic. For applications where the emission source is an array of packaged LED chips, one desires the following:

1. In the focusing direction of a curved reflector, and LED array with a linear fill factor exceeding 80%, 90%, or any range subsumed therein, may be considered a characteristic of one embodiment of this invention. The linear fill factor may, accordingly, have a value between 80% and 100%, 100% possible only with a single LED chip. Linear fill factors greater than 80% are practical only for a single LED chip or for no more than two LED chips separated by a small gap such that the linear fill factor is greater than 80%. Accordingly, the linear fill factor is critical to achieving maximum irradiance around a focal line of a trough reflector.

2. Along a focal line of a curved reflector, in order to provide uniformity at the image plane, one desires a linear fill factor greater than 20%, 30%, 40%, 50%, or any range subsumed therein. Linear fill factors along the focal line of the curved reflector may be increased to increase either the total irradiance at the image plane or increase the irradiance uniformity at the image plane, or both. Some examples of chip packing possibilities are shown in, but are not limited to, the exemplary arrays depicted in FIGS. 7A, 7B, 7C.

Figure 7B:
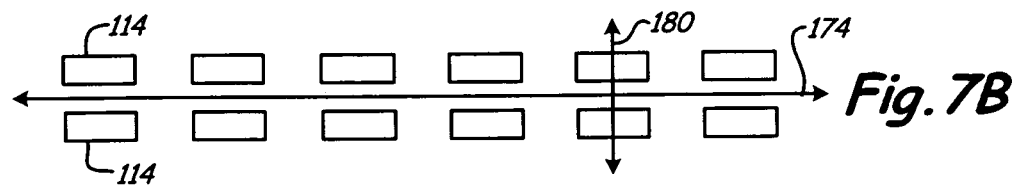
Figure 7C:
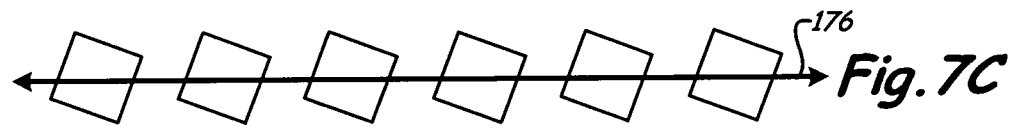

In FIGS. 7A, 7B, 7C, lines 172, 174, 176 represent focal lines of the exemplary trough reflectors positioned on the plane of emitting surface of the LED chip 114. Regarding the array shown in FIG. 6A, the linear fill factor, determined at direction 178 (normal to axis 172 in this example) is 100% due to the single row of LEDs. With respect to FIG. 7B, the linear fill factor is 80%, which is the ratio of the emitting to total emitting and non-emitting lengths along direction 180.

As shown in FIG. 7C, the chips may be rotated. Additionally, LED chips may be square, rectangular, circular, triangular, rhombic, or other shapes.

Deviation from the guidelines described in 1 and 2, above, will reduce the uniformity and irradiance intensity at the image produced by emissions from LED chips as directed by a trough reflector of this invention. By chip, is meant a packaged semiconductor element, the LED array of one embodiment including a plurality of LED chips, a receptacle to fix the LED chips in place and dissipate heat, electrical connections to the LED chips, and optionally a lens or window overlaying the LED chips. A focal line of a reflective trough of this invention may be positioned approximately at the surface of such semiconductor chip.

The concepts described herein may be applied to any LED source, such as an LED emitting UV, visible, or IR wavelengths. In fact, an emission wavelength (or emission peak wavelength) can be different for each LED of a linear array of this invention if so desired so long as the LFL for any one wavelength is more than 20%, thereby limiting the number of wavelengths or peak wavelengths in a given array (depending on the chip configuration) to six or less typically. For example, using the chip arrangements of FIGS. 7A, 7B, 7C, repetitions of the colors red, green, and blue along the linear array of axis 172 may be present. Clearly, combinations of other colors or peak wavelengths could be included as desired. Moreover, in FIG. 7B, different colors could be arranged in different sequences between the top and bottom rows. Applications for multi-colored linear arrays may include 1) UV-emitting lamp structures emitting more than one wavelength, 2) RGB or RGBW (W being the color white) for color-tunable lighting applications, and 3) warm-white, cool-white combinations of variable color temperature lighting applications.

Many UV-curing applications have been optimized for high power mercury discharge lamps, where a linear lamp is positioned along the focal line of a trough reflector, which may be elliptical, parabolic, or another compound shape. The use of LEDs with high linear fill factors as described herein may enable LEDs to concentrate light in much the same way as linear mercury lamps presently accomplish. Less dense arrays of smaller LED chips cannot be as concentrated and, thus, are much less effective for curing applications where high irradiance and/or uniform flood curing is required. In the case of flood curing, large areas of small chip arrays can be used. However, these large areas of small chip arrays are effective only if the source is sufficiently close to the surface to be cured. Otherwise, there is a loss of intensity due to the inverse square law. Concentrated large linear arrays can be employed with parabolic collimating troughs to provide high irradiance at higher separations of the source and the surface to be cured. As described herein, UV LEDs emitting differing wavelengths could be combined as needed for complex formulation curing.

Combinations of focusing optics with visible LEDs with packing densities, such as those described herein, may be used to create a variety of useful irradiance patterns. By carefully controlling the linear fill factor in the focusing direction and along the focal line of a suitably designed trough reflector, irradiance patterns useful for walkway lighting, street lighting, and other applications, can be realized. Moreover, there are advantages to using this type of optical design as compared to large arrays of smaller LEDs. For some embodiments of this invention, these advantages include 1) reduced light pollution by achieving better control of how light is imaged by the reflective optic; and 2) improved optical efficiency with a single simple fixture optic with low glare because LEDs are aimed at the reflector, not at the image plane.

Figure 8:
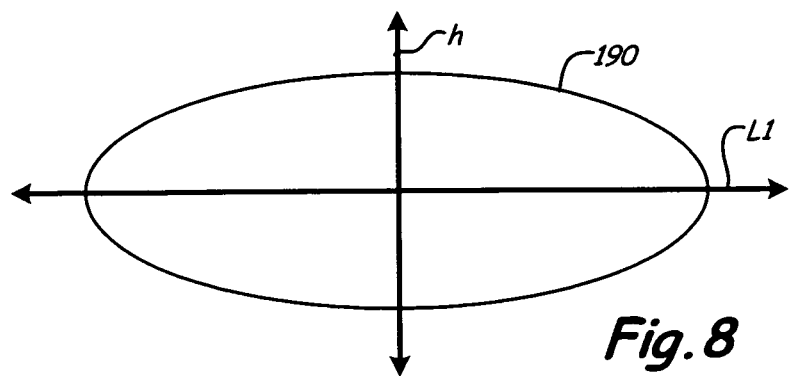
FIG. 8 is an oval light focal pattern of this invention.

One aspect of this invention is that the use of a very high LED packing density, as measured by a high linear fill factor in the focal direction of a curved trough reflector leads to significant advantages for illumination or irradiation system design. This design can be improved upon even more if the LED source possesses an asymmetric irradiation pattern as shown in FIG. 8. Suitable LEDs with such an asymmetric irradiation pattern are disclosed in U.S. Pat. No. 7,348,603, issued 25 Mar. 2008, hereby incorporated by reference. FIG. 8 shows an oval emission profile 190 characterized an asymmetric irradiance pattern where the emission profile 190 is positioned so that the long axis of the emission pattern is substantially parallel to F1 and the short axis of the irradiation pattern is substantially parallel to the focusing direction h. In addition to the method of U.S. Pat. No. 7,348,603, which teaches an asymmetric photonic crystal structure for asymmetric irradiance pattern generation, similar patterns can be created with simple geometric optics or other similar, known beam shaping methods that modify a rotationally symmetric Lambertian LED emission pattern to create the asymmetric pattern of FIG. 8. By orienting the emission pattern as shown in FIG. 8, more of the radiation emitted from the LED surface can be captured within the trough reflector, increasing the amount of source radiation that can be re-imaged at f2 (elliptical) or in a plane containing f2 (parabolic).

Figure 9:
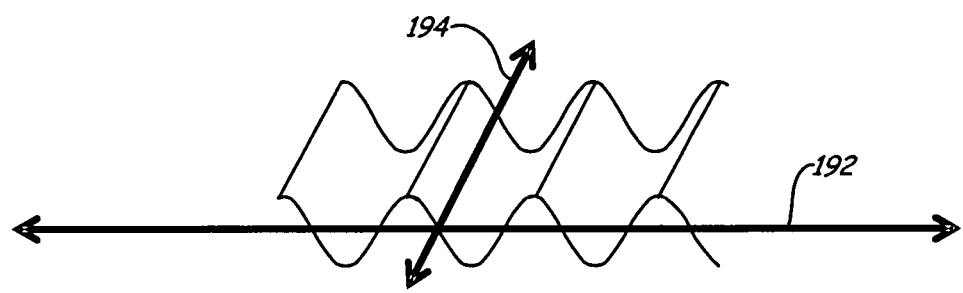
FIG. 9 is a corrugated reflector of this invention.

Thus far, trough reflectors depicted and discussed were simple, having smooth surfaces and without features which would produce additional optical effects other than specular reflection. However, additional performance improvements can be achieved by incorporating certain diffractive surface structures into the reflective surface. These structures may include, but not be limited to, 1) diffraction gratings, 2) corrugation, or 3) either of the above, where the period and amplitude of the grating or corrugation vary along the focal line of the trough reflector. The foregoing surface features may be oriented with a long axis perpendicular to the focal line of the trough reflector. If so, the focusing or collimating effect of the reflector would be largely unaffected. However, the emission incident on the reflector would be spread more widely along the focal line. The image shown in FIG. 9 is exemplary of a possible surface texture. FIG. 9 shows one orientation of a possible surface texture and how this structure may be positioned relative to the focal line 192 (L1) and relative to a direction 194 perpendicular to the focal line 192. Radiation incident upon such a shape would be spread out along direction 192 but would nonetheless be focused or collimated in the direction 194, perpendicular to the direction 192. Other variations might include variation of the period and/or amplitude of the surface texturing while preserving the orientation relative to the focal line as shown in FIG. 9. The reflector surface may be optimized to produce improved irradiance uniformity or color mixing in the event that LEDs of different wavelengths or color temperatures are arranged along the focal line of the patterned trough reflector. The pitch or amplitude of the reflector surface texturing is not fixed and may vary with the same period as inferred from the linear fill factor of the LEDs along the focal line 192 (L1).

Thus far, the overall design of the optical system has been essentially linear in nature, wherein the focal line is a straight line. It is also possible to preserve key aspects of the invention when the focal line (or non-linear focus) is not straight, but is curved or bent in a direction so as to create a required or desired lighting or irradiation pattern. A curved focal line might be employed to create a spot in irradiance pattern (the focal line curves in on itself to form a circle and the curvature is in a plane coplanar to the image plane). The curvature may also be in a plane perpendicular to the image plane, which is potentially useful when two trough reflectors of finite lengths are used for an illumination application, for example, along a sidewalk. Along sidewalks, it is desirable to avoid dark spaces between illuminated areas provided by each fixture. In such a case, the focal line of each fixture might be curved in a plane perpendicular to the sidewalk to increase the light intensity in the gap between fixtures.

More complex shapes are possible when the elliptical or parabolic shape of a trough reflector is varied along a constant focal line. As an example, one might consider the need to irradiate a non-planar surface with a fixed irradiance. In such case, it would be possible to gradually vary the eccentricity of an elliptical trough reflector along a focal line (curved or otherwise) to attain such a goal.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. An assembly for irradiating a surface with UV radiation, comprising:
    a reflector; and
    an array having a plurality of discrete UV light sources arranged spatially in an array pattern with a focusing direction and a direction normal to said focusing direction, a linear fill factor of said pattern being at least 80% along said focusing direction and at least 20% along said normal direction, said UV radiation emitted from said sources and reflected by said reflector onto the irradiated surface; wherein
    said reflector is configured to reimage and focus light from said discrete sources by creating a focused, substantially uniform one-dimensional line of irradiance suitable for curing applications which is imaged substantially free of non-emitting gaps and spaces between said discrete sources onto said irradiated surface.

2. The assembly of claim 1, wherein said UV radiation is collimated by said reflector.

3. The assembly of claim 1, wherein said sources emit a plurality of wavelength peaks.

4. The assembly of claim 1, in which said reflector is parabolic.

5. The assembly of claim 1, in which said reflector is elliptical.

6. The assembly of claim 1, in which said reflector has a corrugated surface.

7. The assembly of claim 6, in which a period of said corrugated surface varies along said normal direction or along said focusing direction.

8. The assembly of claim 1, in which said linear fill factor along said focusing direction is at least 90%.

9. The assembly of claim 1, in which said linear fill factor along said normal direction is at least 30%.

10. The assembly of claim 1, in which said linear fill factor along said normal direction is at least 40%.

11. The assembly of claim 1, in which said linear fill factor along said normal direction is at least 50%.

12. A method of manufacturing an assembly for irradiating a surface with UV radiation, said method comprising positioning an array of discrete UV light sources such that UV radiation emitted from said array is focused or collimated by a reflector, wherein:
    said array includes a plurality of discrete UV light sources arranged in a pattern such that a first linear fill factor along a focusing direction is greater than 80% and such that a second linear fill factor along a direction normal to said focusing direction is greater than 20%; and
    said reflector is configured to reimage and focus light from said discrete sources by creating a focused, substantially uniform one-dimensional line of irradiance suitable for curing applications which is imaged substantially free of non-emitting gaps and spaces between said discrete sources onto the irradiated surface.

13. The method of claim 12, wherein said UV radiation is collimated.

14. The method of claim 12, wherein said first linear fill factor is greater than 90%.

15. The method of claim 12, wherein said second linear fill factor is greater than 30%.

16. The method of claim 12, wherein said second linear fill factor is greater than 40%.

17. The method of claim 12, wherein said second linear fill factor is greater than 50%.

18. A method for irradiating a surface with UV radiation, said method comprising emitting said UV radiation from an array of discrete UV light sources such that said UV radiation irradiates said surface after being focused or collimated by a reflector, said array including a plurality of discrete UV light sources arranged in a pattern such that a first linear fill factor along a focusing direction defined by said pattern is greater than 80% and such that a second linear fill factor along a direction normal to said focusing direction is greater than 20%; and
    said reflector reimages and focuses light from said discrete sources by creating a focused, substantially uniform one-dimensional line of irradiance used for curing applications which is imaged substantially free of non-emitting gaps and spaces between said discrete sources onto said irradiated surface.

19. The method of claim 18, wherein said first linear fill factor is greater than 90%.

20. The method of claim 18, wherein said second linear fill factor is greater than 30%.

21. The method of claim 18, wherein said second linear fill factor is greater than 40%.

22. The method of claim 18, wherein said second linear fill factor is greater than 50%.

23. The method of claim 18, wherein a curable substance is disposed on said surface, said curable substance being irradiated when said surface is irradiated.

24. The assembly of claim 1, wherein said plurality of discrete UV light sources comprises a plurality of light emitting diodes (LEDs).

25. The method of claim 12, wherein said plurality of discrete UV light sources comprises a plurality of light emitting diodes (LEDs).

26. The method of claim 18, wherein said plurality of discrete UV light sources comprises a plurality of light emitting diodes (LEDs).

27. The assembly of claim 6, in which an amplitude of said corrugated surface varies along said normal direction or along said focusing direction.

* * * * *